US010105710B2

(12) United States Patent
Chen

(10) Patent No.: US 10,105,710 B2
(45) Date of Patent: Oct. 23, 2018

(54) MEAT GRINDER

(71) Applicant: Yu-Cheng Chen, Taichung (TW)

(72) Inventor: Yu-Cheng Chen, Taichung (TW)

( * ) Notice: Subject to any disclaimer, the term of this patent is extended or adjusted under 35 U.S.C. 154(b) by 754 days.

(21) Appl. No.: 14/710,030

(22) Filed: May 12, 2015

(65) Prior Publication Data

US 2016/0332166 A1 Nov. 17, 2016

(51) Int. Cl.
*B02C 18/30* (2006.01)
*A22C 17/00* (2006.01)

(52) U.S. Cl.
CPC ........ *B02C 18/302* (2013.01); *A22C 17/0026* (2013.01); *B02C 18/305* (2013.01)

(58) Field of Classification Search
CPC ........................... B02C 18/302; B02C 18/305
USPC ............................................... 241/82.6, 82.1
See application file for complete search history.

(56) References Cited

U.S. PATENT DOCUMENTS 908,714 A * 1/1909 Warner ................. B02C 18/302 241/82.6
1,009,596 A * 11/1911 Steiner ................. B02C 18/302 241/82.6
2,012,167 A * 8/1935 Johnston ............... B02C 18/302 241/37.5
2,445,037 A * 7/1948 Richard ................ B02C 18/302 241/82.6
2,655,967 A * 10/1953 Mallory .................. B02C 18/30 188/67
2,665,725 A * 1/1954 Lundell ................. B02C 18/302 241/82.6
2,730,147 A * 1/1956 Rees ..................... B02C 18/302 241/37.5
2,792,042 A * 5/1957 Dwyer .................. B02C 18/302 241/285.1
2,931,408 A * 4/1960 Dwyer .................... A47J 43/04 241/65
3,132,680 A * 5/1964 Schill .................... B02C 18/302 241/247

FOREIGN PATENT DOCUMENTS

EP 0467428 * 1/1992

* cited by examiner

*Primary Examiner* — Faye Francis
*Assistant Examiner* — Smith O Bapthelus
(74) *Attorney, Agent, or Firm* — Lerner, David, Littenberg, Krumholz & Mentlik, LLP

(57) ABSTRACT

A meat grinder has a motor assembly and a grinding assembly. The motor assembly has a motor. The motor has an output axle having an annular abutting surface. The grinding assembly is securely connected with the motor assembly and has a grinding tube, a threaded rod, a blade, and an extrusion panel. The grinding tube is connected to the casing of the motor assembly and has an annular connecting base. The threaded rod is rotatably mounted in the grinding tube and has a connection segment. The connection segment is mounted through the connecting base, is connected with the output axle of the motor, and is stepped in section to form an annular abutting shoulder. The abutting shoulder is formed around the connecting segment and abuts the annular abutting surface of the output axle.

4 Claims, 5 Drawing Sheets

11
111
223
112
d1
d2
222
221
218
214
215
22
211
21
213
20
216
242
24
212
23

MEAT GRINDER

BACKGROUND OF THE INVENTION

Field of the Invention

The present invention relates to a meat grinder, and more particularly to a meat grinder that can be operated smoothly.

Description of Related Art

With reference to FIGS. 4 and 5, a conventional meat grinder comprises a motor assembly 80 and a grinding assembly 90. The motor assembly 80 comprises a rectangular casing and a motor mounted in the casing. The motor has a hollow output axle 81. The grinding assembly 90 is connected to a front side of the motor assembly 80 and comprises a grinding tube 91, a threaded rod 92, a blade 93, an extrusion panel 94, and a limiting collar 95. The grinding tube 91 is L-shaped, and the threaded rod 92 is rotatably mounted in the grinding tube 91. The threaded rod 92 has an annular abutting flange 921 formed around the threaded rod 92 at a position adjacent to a rear end of the threaded rod 92 and a connecting axle 922 formed on the rear end of the threaded rod 92. The connecting axle 922 is inserted into and connected with the output axle 81. The blade 93 is mounted on a front end of the threaded rod 92. The extrusion panel 94 is mounted on a front end of the grinding tube 91 and is spaced from the blade 93. The limiting collar 95 is mounted around the connecting axle 922 and abuts the abutting flange 921 and the front side of the motor assembly 80. A gap is formed between an end surface of the connecting axle 922 and an inner bottom surface of the output axle 81, such that the limiting collar 95 is kept abutting the abutting flange 921 and the blade 93 is kept being spaced from the extrusion panel 94. Accordingly, the threaded rod 92 is kept from being interfered with an inner surface of the grinding tube 91, and the rotation of the threaded rod 92 is smooth.

However, when the limiting collar 95 is a bearing, lubricant oil in the bearing may leak out from the bearing and pollute the ground meat in the grinding tube 91 by the threaded rod 92. In addition, the rotation of the bearing with leaking lubricant oil is not smooth and even jammed. Furthermore, the temperature of the bearing will increase after a time of operation, the high temperature of the bearing will cause bad influence to the quality of the meat.

When the limiting collar 95 is made of resilient plastic steel, the plastic steel limiting collar 95 is not rotated with the threaded rod 92 synchronously. A friction is generated between the limiting collar 95 and the threaded rod 92, and the powders dropped from the limiting collar 92 will also pollute the ground meat. In addition, the temperature of the limiting collar 95 will increase due to the friction, the high temperature of the limiting collar 95 will also cause bad influence to the quality of the meat.

When the limiting collar 95 is made of copper, the copper limiting collar 95 has a higher stiffness than the plastic steel limiting collar. The copper limiting collar 95 does not easily produce powders during the rotation of the copper limiting collar 95, but the rotation of the threaded rod 92 is not smooth because of the high stiffness of the copper limiting collar 95. In addition, the temperature of the limiting collar 95 and the threaded rod 92 will increase due to the friction, the high temperature of the limiting collar 95 and the threaded rod 92 will also cause bad influence to the quality of the meat.

To overcome the shortcomings, the present invention tends to provide a meat grinder to mitigate or obviate the aforementioned problems.

SUMMARY OF THE INVENTION

The main objective of the invention is to provide a meat grinder that has a simplified structure.

The meat grinder has a motor assembly and a grinding assembly. The motor assembly has a casing and a motor mounted in the casing. The motor has an output axle having an annular abutting surface formed on an end of the output axle. The grinding assembly is securely connected with the motor assembly and has a grinding tube, a threaded rod, a blade, and an extrusion panel. The grinding tube is connected to the casing of the motor assembly and has a tubular body, a meat outlet, and an annular connecting base. The tubular body is connected to the casing of the motor assembly and has a first end and a second end opposite the first end and connected to the casing of the motor assembly. The meat outlet is defined in the first end of the tubular body. The annular connecting base is formed on the second end of the tubular body and has a central hole defined through the connecting base. The threaded rod is rotatably mounted in the tubular body and has a first end, a second end, and a connection segment. The second end is opposite the first end of the threaded rod. The connection segment is formed on the second end of the threaded rod, is mounted through the central hole in the connecting base, is connected with the output axle of the motor, and is stepped in section to form an annular abutting shoulder. The abutting shoulder is formed around the connecting segment and abuts the annular abutting surface of the output axle of the motor. The blade is mounted on the first end of the threaded rod. The extrusion panel is mounted on the meat outlet of the tubular body.

Other objects, advantages and novel features of the invention will become more apparent from the following detailed description when taken in conjunction with the accompanying drawings.

DETAILED DESCRIPTION OF PREFERRED EMBODIMENT

Figure 1:
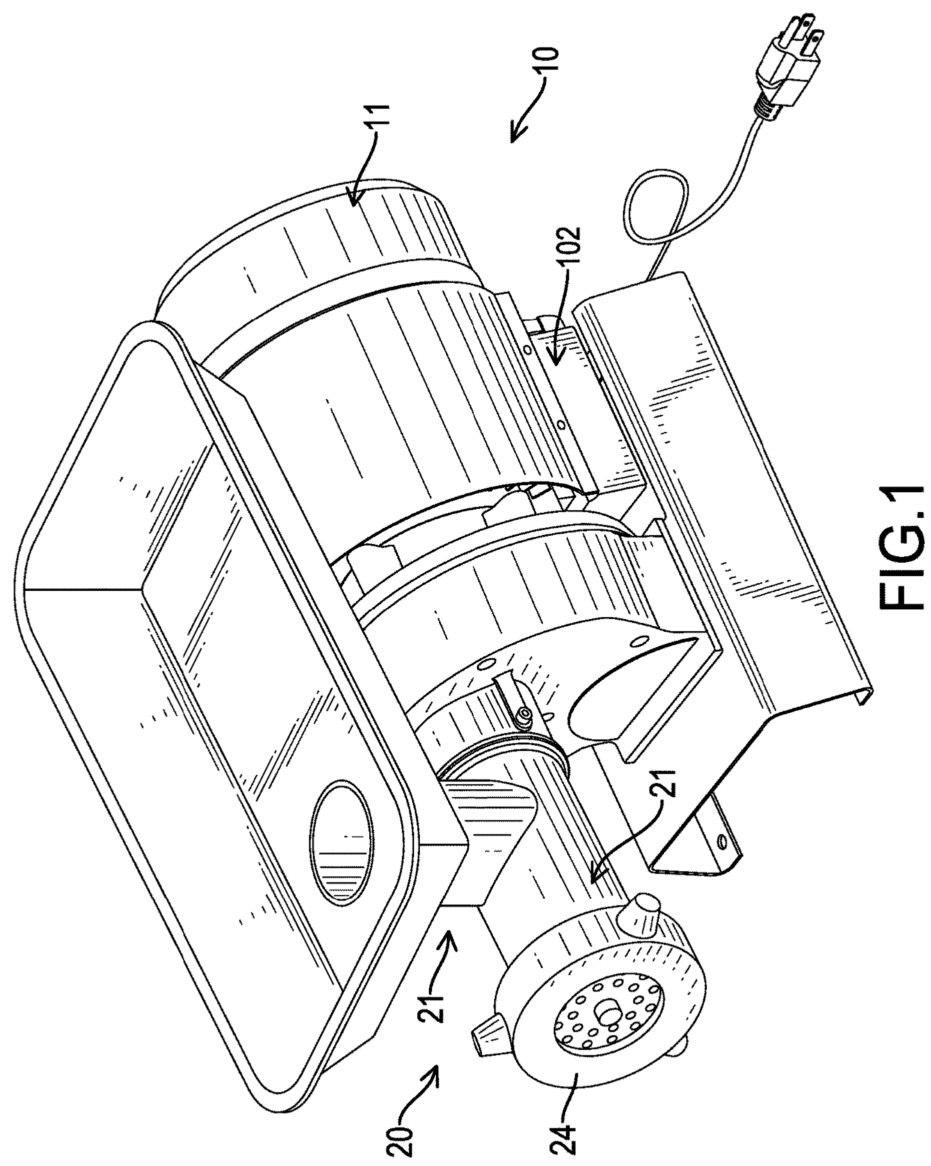
FIG. 1 is a perspective view of a meat grinder in accordance with the present invention.
Figure 2:
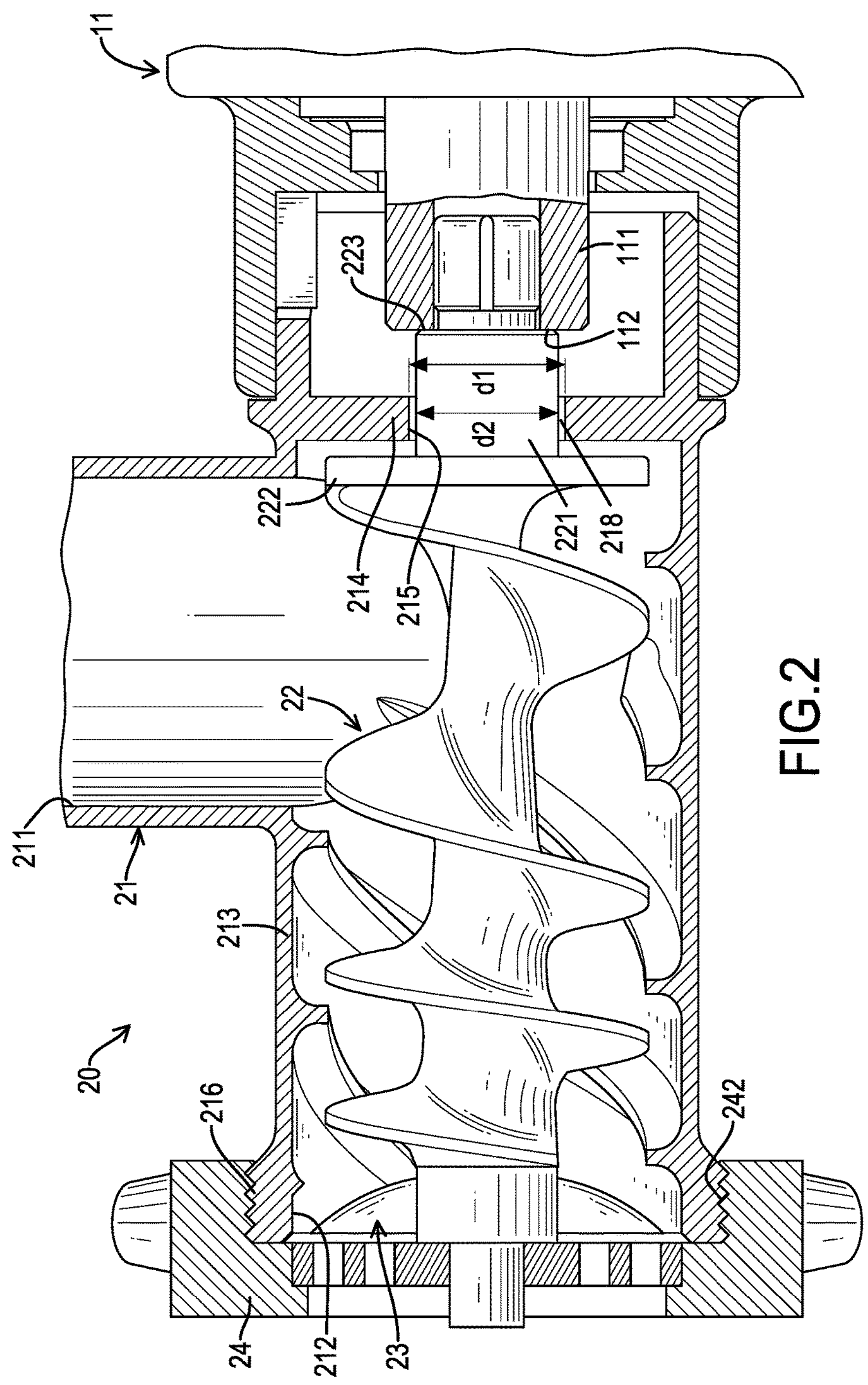
FIG. 2 is a side view in partial section of the meat grinder in FIG. 1.

With reference to FIGS. 1 and 2, a meat grinder in accordance with the present invention comprises a motor assembly 10 and a grinding assembly 20.

The motor assembly 10 comprises a casing 102 and a motor 11. The casing 102 is rectangular. The motor 11 is mounted in the casing 102 and has an output axle 111. The output axle 111 is hollow and has an annular abutting surface 112 formed on an end of the output axle 111.

The grinding assembly 20 is securely connected with the motor assembly 10 and comprises a grinding tube 21, a threaded rod 22, a blade 23, and an extrusion panel 24.

The grinding tube 21 is connected to the casing 102 of the motor assembly 10 and comprises a tubular body 213, a meat inlet 211, a meat outlet 212, and an annular connecting base 214. The tubular body 213 may be L-shaped, is connected to the casing 102 of the motor assembly 10, and has a first end and a second end opposite the first end and connected to the casing 102 of the motor assembly 10. The meat inlet 211 is defined in a top of the tubular body 213, and the meat outlet 212 is defined in the first end of the tubular body 213. The annular connecting base 214 is formed on the second end of the tubular body 213 and has a central hole 215 defined through the connecting base 214.

The threaded rod 22 is rotatably mounted in the tubular body 213 and has a first end, a second end opposite the first end of the threaded rod 22, an annular flange 222, and a connection segment 221. The annular flange 222 is held in the tubular body 213 and is annularly formed around the threaded rod 22 at a position adjacent to the second end of the threaded rod 22. The connection segment 221 is formed on the second end of the threaded rod 22, is mounted through the central hole 215 in the connecting base 214, is inserted into and connected with the output axle 111 of the motor 11, and is stepped in section to form an annular abutting shoulder 223. The abutting shoulder 223 is formed around the connecting segment 221 and abuts the annular abutting surface 112 of the output axle 111 of the motor 11. With the abutment between the abutting shoulder 223 and the abutting surface 112 of the output axle 111, the annular flange 222 is spaced from the inner surface of the connecting base 214 of the grinding tube 21 to form a gap between the annular flange 222 and the inner surface of the connecting base 214 of the grinding tube 21. A gap is also formed between the end surface of the connecting segment 221 of the threaded rod 22 and the inner bottom of the output axle 111 due to the abutment between the abutting shoulder 223 and the abutting surface 112 of the output axle 111. Accordingly, the rotation of the threaded rod 22 is kept from being interfered with the tubular body 213 of the grinding tube 21. In addition, the connection segment 221 has a diameter d2 smaller than a diameter d1 of the central hole 215 of the annular connecting base 214 to form a gap 218 between the connection segment 221 and the central hole 215 in the annular connecting base 214.

The blade 23 is mounted on the first end of the threaded rod 22 and is adjacent to the meat outlet 212 in the first end of the tubular body 213.

The extrusion panel 24 is mounted securely on the meat outlet 212 of the tubular body 213. Preferably, the tubular body 213 further has an outer thread 216 formed on the first end of the tubular body 213 and around the meat outlet 212, and the extrusion panel 24 has an inner thread 242 screwed with the outer thread 216 on the tubular body 213 to securely attach the extrusion panel 24 to the tubular body 213.

Figure 3:
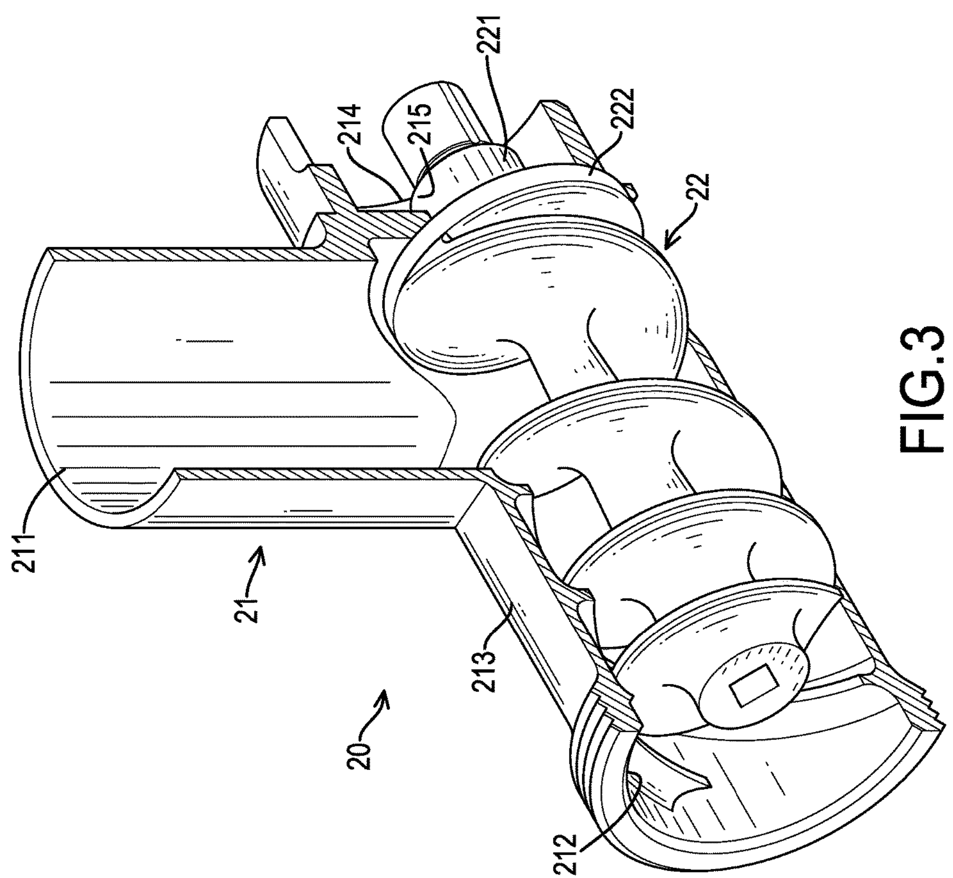
FIG. 3 is an enlarged perspective view in partial section of a grinding assembly of the meat grinder in FIG. 1.
Figure 4:
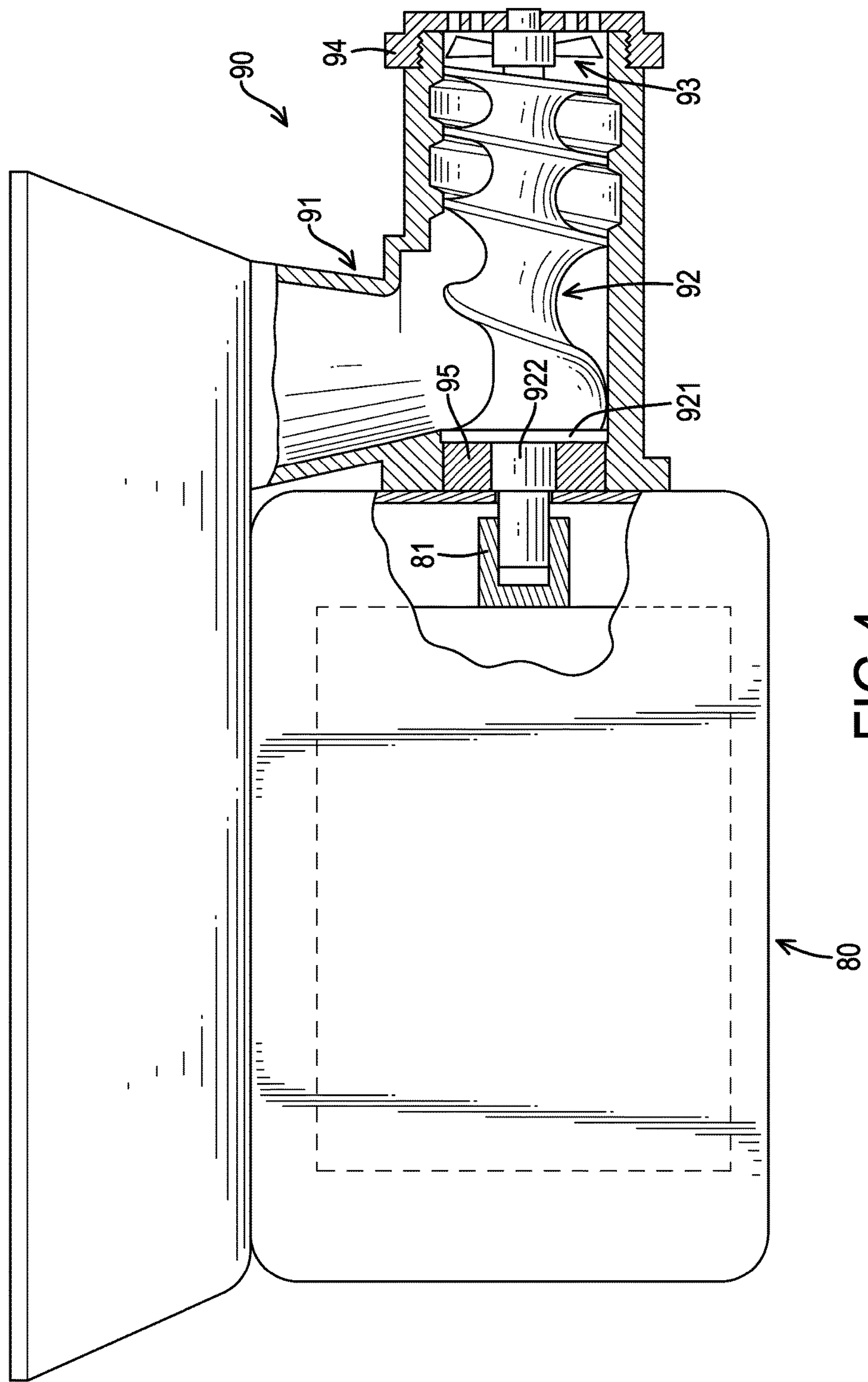
FIG. 4 is a side view in partial section of a conventional meat grinder.
Figure 5:
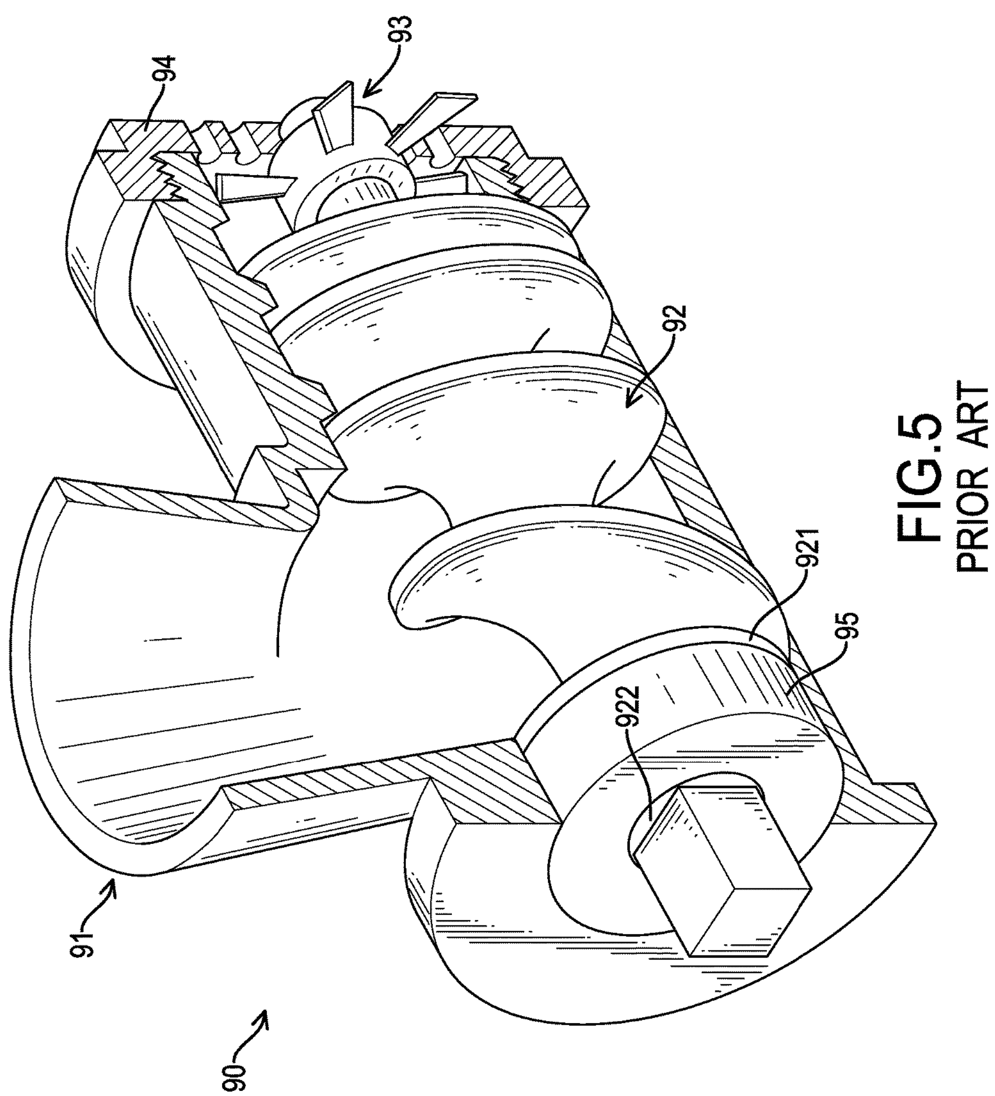
FIG. 5 is an enlarged perspective view in partial section of a grinding assembly of the conventional meat grinder in FIG. 1.

With reference to FIGS. 2 and 3, when the meat grinder in accordance with the present invention is in use, the threaded rod 22 can be axially held in position with the abutment between the abutting shoulder 223 on the connection segment 221 of the threaded rod 22 and the abutting surface 112 of the output axle 111 of the motor 11. Furthermore, with the gap formed between the annular flange 222 and the inner surface of the connecting base 214 and the gap formed between the end surface of the connecting segment 221 of the threaded rod 22 and the inner bottom of the output axle 111, the threaded rod 22 can rotate smoothly, and the blade 23 can be held actually in position to form a gap between the blade 23 and the extrusion panel 24. In addition, because the annular flange 222 of the threaded rod 22 is kept from abutting the inner surface of the tubular body 213, friction can be prevented from generating between the threaded rod 22 and the grinding tube 21. The threaded rod 22 can rotate in a low friction condition, so the threaded rod 22 can rotate smoothly and the grinding efficiency of the meat grinder in accordance with the present invention can be improved. In addition, because a limiting collar 95 as shown in FIGS. 4 and 5 is not a necessary component for the meat grinder in accordance with the present invention, the structure of the meat grinder can be simplified and the cost for manufacturing the meat grinder can be reduced. In addition, no friction will generate between the threaded rod 22 and the other component, the power provided by the motor 11 will be sufficiently transmitted to the threaded rod 22 and no power waste will occur during the transmission of the motor 11 to the threaded rod 22.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A meat grinder comprising:
a motor assembly comprising:
a casing; and
a motor mounted in the casing and having an output axle having an annular abutting surface formed on an end of the output axle;
a grinding assembly securely connected with the motor assembly and comprising
a grinding tube connected to the casing of the motor assembly and comprising:
a tubular body connected to the casing of the motor assembly and having
a first end; and
a second end opposite the first end and connected to the casing of the motor assembly;
a meat outlet defined in the first end of the tubular body; and
an annular connecting base formed on the second end of the tubular body and having a central hole defined through the annular connecting base and having a diameter;
a threaded rod rotatably mounted in the tubular body and having
a first end;
a second end opposite the first end of the threaded rod; and
a connection segment formed on the second end of the threaded rod, mounted through the central hole in the annular connecting base, connected with the output axle of the motor, and being stepped in section to form an annular abutting shoulder around the connecting segment and abutting the annular abutting surface of the output axle of the motor, wherein the connection segment has a diameter smaller than the diameter of the central hole of the annular connecting base to form a gap between the connection segment and the central hole in the annular connecting base;
a blade mounted on the first end of the threaded rod; and
an extrusion panel mounted on the meat outlet of the tubular body.

2. The meat grinder as claimed in claim 1, wherein the threaded rod further comprises an annular flange held in the tubular body, formed around the threaded rod at a position adjacent to the connection segment, and spaced from an inner surface of the annular connecting base of the tubular body.

3. The meat grinder as claimed in claim 2, wherein the tubular body further has an outer thread formed on the first end of the tubular body and around the meat outlet; and the extrusion panel has an inner thread screwed with the outer thread on the tubular body to securely attach the extrusion panel to the tubular body.

4. The meat grinder as claimed in claim 1, wherein the tubular body further has an outer thread formed on the first end of the tubular body and around the meat outlet; and the extrusion panel has an inner thread screwed with the outer thread on the tubular body to securely attach the extrusion panel to the tubular body.

* * * * *